(12) United States Patent
Benco et al.

(10) Patent No.: US 7,103,346 B2
(45) Date of Patent: Sep. 5, 2006

(54) SATELLITE AND CELLULAR USAGE CHARACTERISTICS DETERMINATION

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 212 days.

(21) Appl. No.: 10/818,030

(22) Filed: Apr. 5, 2004

(65) Prior Publication Data

US 2005/0221854 A1    Oct. 6, 2005

(51) Int. Cl.
*H04M 11/00*    (2006.01)

(52) U.S. Cl. .............. 455/406; 455/552.1; 455/553.1; 455/3.02; 455/427; 455/12.1; 379/119; 379/114.01; 379/114.03; 379/114.05; 379/114.28; 725/142; 725/134; 725/151; 725/58; 725/86

(58) Field of Classification Search ............. 379/119, 379/114.01, 114.03, 114.05, 114.28; 455/552.11, 455/553.1, 3.02, 422, 12.1; 725/142, 134, 725/151, 58, 86
See application file for complete search history.

(56) References Cited

U.S. PATENT DOCUMENTS

| | | | |
|---|---|---|---|
| 5,732,359 | A | 3/1998 | Baranowsky, II et al. |
| 6,668,046 | B1* | 12/2003 | Albal ................. 379/119 |
| 2002/0147992 | A1* | 10/2002 | King et al. ........... 725/142 |
| 2005/0229212 | A1* | 10/2005 | Kuether et al. ........ 725/58 |
| 2006/0025069 | A1* | 2/2006 | Benco et al. .......... 455/3.02 |

OTHER PUBLICATIONS

GLOBALSTAR USA, Handheld Phone, Mar. 3, 2004, pp. 1-3, Globalstar USA, California, USA; http://www.globalstarusa.com/phones/handheld/.

* cited by examiner

*Primary Examiner*—Joseph Feild
*Assistant Examiner*—David Q. Nguyen

(57) ABSTRACT

A network component of an apparatus in one example determines one or more usage characteristics of a mobile communication device for a cellular communications network and one or more usage characteristics of the mobile communication device for a satellite communications network.

20 Claims, 1 Drawing Sheet

SATELLITE AND CELLULAR USAGE CHARACTERISTICS DETERMINATION

TECHNICAL FIELD

The invention relates generally to mobile communications and more particularly to satellite and cellular usage.

BACKGROUND

Cellular phones must be within range of a cellular base station to operate. While cellular phone coverage is available in most areas with a high population density, in less inhabited areas it is not economically feasible to provide complete cellular coverage. Rough and/or uneven terrain also causes a decrease in cellular coverage. Satellite phones offer an alternative to cellular phones that provide a much larger coverage area. However, present satellite services are not compatible with cellular services. A user must have a separate service plan, and often a separate phone, for satellite and cellular services.

Thus, a need exists for an increase in integration of satellite service plans and cellular service plans.

SUMMARY

In one embodiment, there is provided an apparatus comprising a network component that determines one or more usage characteristics of a mobile communication device for a cellular communications network and one or more usage characteristics of the mobile communication device for a satellite communications network.

In another embodiment, there is provided a method for providing for an account of a mobile communication device one bill for both a satellite service to the mobile communication device and a cellular service to the mobile communication device.

In yet another embodiment, there is provided an article comprising one or more computer-readable signal-bearing media. The article includes means in the one or more media for providing for an account of a mobile communication device one bill for both a satellite service to the mobile communication device and a cellular service to the mobile communication device.

DESCRIPTION OF THE DRAWINGS

Features of exemplary implementations of the invention will become apparent from the description, the claims, and the accompanying drawings in which:

DETAILED DESCRIPTION

Figure 1:
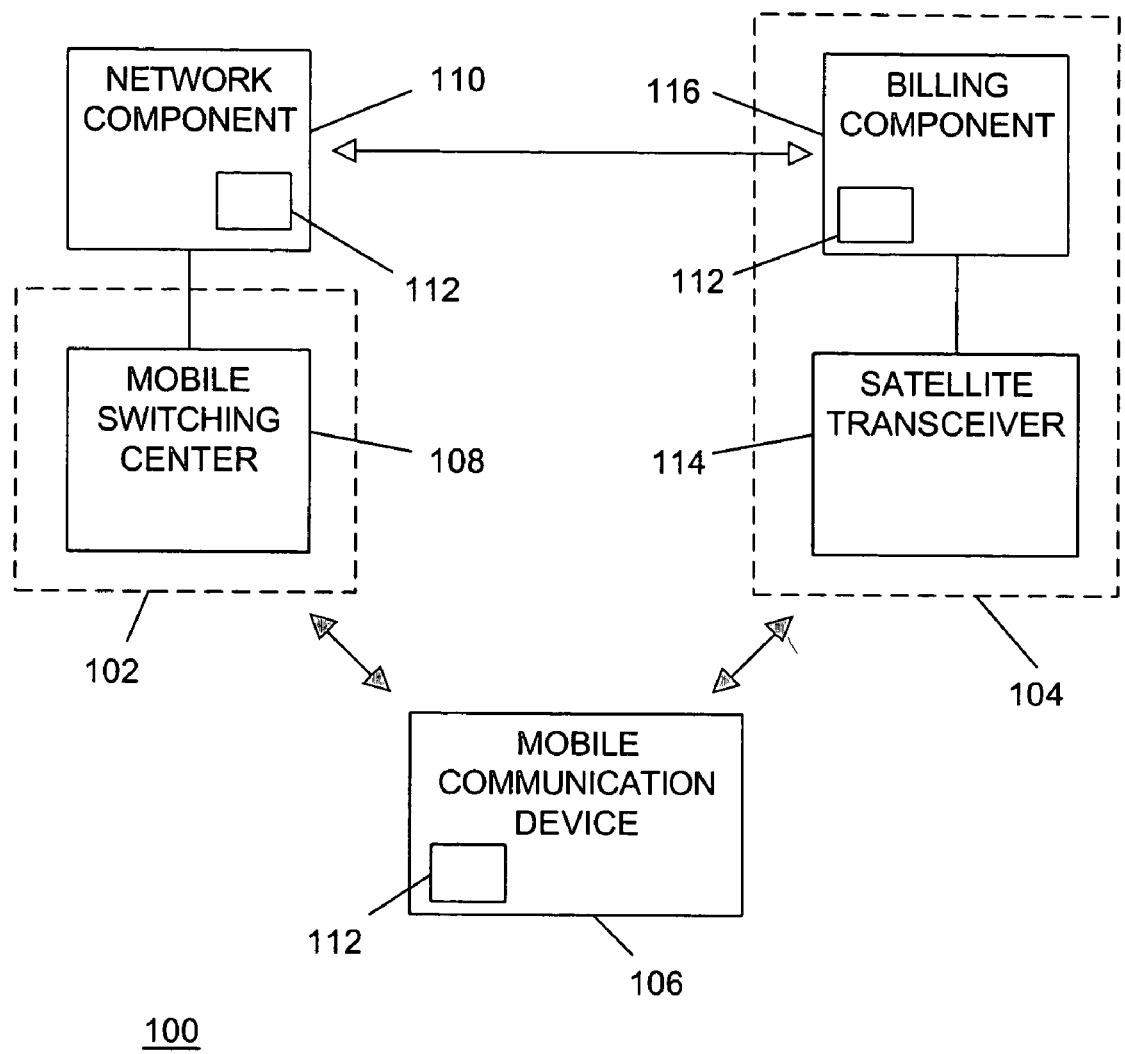
FIG. 1 is a representation of one implementation of an apparatus that comprises a cellular network, a satellite network, and a mobile communication device.

Turning to FIG. 1, an apparatus 100 in one example comprises a cellular network 102, a satellite network 104, a mobile communication device 106, and a network component 110. The cellular network 102 in one example comprises a mobile switching center 108. The cellular network 102 provides a cellular service to the mobile communication device 106. For example, the mobile switching center 108 cooperates with a cellular base station (not shown) to route calls to and/or from the mobile communication device 106. The network component 110 in one example comprises a billing component. For example, the network component 110 prepares a bill for usage of the cellular network 102 and the satellite network 104 by the mobile communication device 106, as described herein. The network component 110 in one example comprises a portion of the cellular network 102. The network component 110 in one example comprises an instance of a recordable data storage medium 112, as described herein.

The satellite network 104 in one example comprises a satellite transceiver 114 and a billing component 116. The satellite network 104 provides a satellite service to the mobile communication device 106. For example, the satellite transceiver 114 routes calls to and/or from the mobile communication device 104. The billing component 116 stores usage data of the mobile communication device 106 on the satellite network 104, as described herein. The billing component 116 is communicatively coupled with the network component 110. The billing component 116 in one example comprises an instance of the recordable data storage medium 112, as described herein.

The mobile communication device 106 in one example comprises a mobile phone and/or personal digital assistant that is operable on any of the cellular network 102 and the satellite network 104. The mobile communication device 106 in one example operates on both the cellular network 102 and the satellite network 104 simultaneously. For example, the mobile communication device 106 monitors both networks for signal strength and/or incoming calls. In another example, the mobile communication device 106 operates on the cellular network 102 at a first time, and operates on the satellite network 104 at a second time. The mobile communication device 106 in one example comprises an instance of the recordable data storage medium 112, as described herein.

The mobile communication device 106 in one example sends and/or receives calls over the cellular network 102 and the satellite network 104. The network component 110, the mobile communication device 106, and/or the billing component 116 store usage data for the calls. The network component 110 determines one or more usage characteristics of the mobile communication device 106 based on the usage data. Exemplary usage characteristics comprise average call durations, call costs, and total usage time. Exemplary usage data comprises call start and end times and billing rates, as will be appreciated by those skilled in the art.

An illustrative description of exemplary operation of the apparatus 100 is presented, for explanatory purposes. The mobile communication device 106 receives a cellular service from the cellular network 102 and a satellite service from the satellite network 104. A user of the mobile communication device 106 makes one or more cellular calls that are routed over the cellular network 102. The network component 110 obtains usage data for the cellular calls from the mobile switching center 108. For example, the network component 110 obtains one or more of a start time, an end time, and a billing rate for the cellular calls from the mobile switching center 108. In one example, the network component 110 requests the usage data from the billing component 116. In another example, the billing component 116 sends the usage data to the network component 110, for example, on a pre-set schedule. The network component 110 determines one or more usage characteristics of the cellular calls based on the usage data for the cellular calls. For example, the network component 110 determines a cost for the cellular calls.

The user of the mobile communication device 106 makes one or more satellite calls that are routed over the satellite network 104. The billing component 116 stores usage data for the satellite calls. For example, the billing component 116 stores one or more of a start time, an end time, and a billing rate for the satellite calls. The network component 110 obtains the usage data for the satellite calls from the billing component 116. For example, the network component 110 exchanges one or more messages with the billing component 116 to request the usage data for the satellite calls. In another example, the network component 110 obtains the usage data from the mobile communication device 106. In a further example, the network component 110 and the mobile communication device 106 comprise a same component. The network component 110 employs the usage data for the satellite calls to determine the usage characteristics of the satellite calls. The network component 110 prepares one bill for the satellite service and the cellular service. For example, the bill comprises the usage characteristics for both the satellite calls and the cellular calls.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. Examples of a computer-readable signal-bearing medium for the apparatus 100 comprise the recordable data storage medium 112 of the mobile communication device 106, the network component 110, and the billing component 116. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    a first billing component of a cellular communications network that determines:
        one or more usage characteristics of a mobile communication device for the cellular communications network; and
        one or more usage characteristics of the mobile communication device for a satellite communications network;
    wherein the first billing component is communicatively coupled with a second billing component of the satellite communications network;
    wherein the first billing component obtains usage data from the second billing component.

2. The apparatus of claim 1, wherein the first billing component prepares for an account of the mobile communication device one bill for:
    one or more of the one or more usage characteristics of the mobile communication device for the cellular communications network; and
    one or more of the one or more usage characteristics of the mobile communication device for the satellite communications network.

3. The apparatus of claim 1,
    wherein the first billing component employs the usage data to determine one or more of the one or more usage characteristics of the mobile communication device for the satellite communications network.

4. The apparatus of claim 1 wherein the first billing component exchanges one or more messages with the second billing component of the satellite communications network to obtain the usage data from the second billing component.

5. The apparatus of claim 1, wherein the first billing component obtains the usage data from the second billing component through the mobile communication device;
    wherein the first billing component employs the usage data to determine one or more of the one or more usage characteristics of the mobile communication device for the satellite communications network.

6. The apparatus of claim 5, wherein the first billing component and the mobile communication device comprise a same component.

7. The apparatus of claim 1, wherein the mobile communication device is operable on the cellular communications network and the satellite communications network.

8. The apparatus of claim 7, wherein the mobile communication device operates on the cellular communications network at a first time and operates on the satellite communications network at a second time.

9. The apparatus of claim 7, wherein the mobile communication device simultaneously operates on the cellular communications network and the satellite communications network.

10. The apparatus of claim 1, wherein the one or more usage characteristics comprise:
    one or more call durations;
    one or more call costs; and/or
    one or more total usage time.

11. The apparatus of claim 1, wherein the second billing component sends the usage data to the first billing component on a pre-set schedule.

12. A method, comprising the steps of:
    providing a cellular service to a mobile communication device through a cellular communications network, wherein the cellular communications network comprises a first billing component;
    providing a satellite service to the mobile communication device through a satellite communications network, wherein the satellite communications network comprises a second billing component;
    obtaining, by the first billing component, usage data for the satellite service from the second billing component;
    providing for an account of the mobile communication device one bill for both the satellite service to the mobile communication device and the cellular service to the mobile communication device based on the usage data for the satellite service.

13. The method of claim 12, further comprising the step of:
preparing the bill for both the satellite service to the mobile communication device and the cellular service to the mobile communication device based on one or more usage characteristics of the mobile communication device.

14. The method of claim 13, wherein the step of preparing the bill for both the satellite service to the mobile communication device and the cellular service to the mobile communication device based on the one or more usage characteristics of the mobile communication device comprises the step of:
determining one or more satellite usage characteristics of the mobile communication device for the satellite service from the usage data for the satellite service.

15. The method of claim 13, wherein the step of preparing the bill for both the satellite service to the mobile communication device and the cellular service to the mobile communication device based on the one or more usage characteristics of the mobile communication device comprises the step of:
determining one of more cellular usage characteristics of the mobile communication device for the cellular service.

16. The method of claim 12, wherein the step of obtaining, by the first billing component, usage data for the satellite service from the second billing component comprises the step of:
receiving, from the second billing component on a pre-set schedule, one or more messages that comprise the usage data for the satellite service.

17. The method of claim 12, wherein the step of obtaining, by the first billing component, usage data for the satellite service from the second billing component comprises the step of:
obtaining the usage data from the second billing component through the mobile communication device.

18. An article, comprising:
one or more computer-readable signal-bearing media; and
means in the one or more media for providing a cellular service to a mobile communication device through a cellular communications network, wherein the cellular communications network comprises a first billing component;
means in the one or more media for providing a satellite service to the mobile communication device through a satellite communications network, wherein the satellite communications network comprises a second billing component;
means in the one or more media for obtaining, by the first component, usage data for the satellite service from the second billing component;
means in the one or more media for providing for an account of the mobile communication device one bill for both the satellite service to the mobile communication device and the cellular service to the mobile communication device based on the usage data for the satellite service.

19. The article of claim 18, further comprising:
means in the one or more media for preparing the bill for both the satellite service to the mobile communication device and the cellular service to the mobile communication device based on one or more usage characteristics of the mobile communication device.

20. The article of claim 19, wherein the means in the one or more media for preparing the bill for both the satellite service to the mobile communication device and the cellular service to the mobile communication device based on the one or more usage characteristics of the mobile communication device comprises:
means in the one or more media for determining the one or more satellite usage characteristics of the mobile communication device for the satellite service based on the usage data from the satellite communications network.

* * * * *